US011897346B2

(12) United States Patent
Ives et al.

(10) Patent No.: US 11,897,346 B2
(45) Date of Patent: *Feb. 13, 2024

(54) ELECTRICAL MOTOR POWER CONTROL SYSTEMS

(71) Applicant: Hamilton Sundstrand Corporation, Charlotte, NC (US)

(72) Inventors: Kyle Stephen Ives, Loves Park, IL (US); John N. Buzzard, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/321,177

(22) Filed: May 14, 2021

(65) Prior Publication Data

US 2021/0354569 A1  Nov. 18, 2021

Related U.S. Application Data

(60) Provisional application No. 63/025,901, filed on May 15, 2020.

(51) Int. Cl.
*H02P 1/00* (2006.01)
*B60L 50/60* (2019.01)
(Continued)

(52) U.S. Cl.
CPC .............. *B60L 50/60* (2019.02); *B60L 50/52* (2019.02); *B60L 58/12* (2019.02); *B64D 27/24* (2013.01);
(Continued)

(58) Field of Classification Search
CPC .. H02P 2205/03; H02P 2205/05; H02P 23/14; B60L 50/60; B60L 58/12;
(Continued)

(56) References Cited

U.S. PATENT DOCUMENTS 8,423,211 B2   4/2013  Li
8,543,274 B2   9/2013  Ikegami et al.
(Continued)

FOREIGN PATENT DOCUMENTS

DE   102013202714 A1   8/2013
WO    2016093905 A1   6/2016
WO   WO-2018047351 A1 * 3/2018 ............. B60K 6/445

OTHER PUBLICATIONS

Extended European search report issued in corresponding EP application No. 21174213.5, dated Oct. 11, 2021, ( 9 pages).

*Primary Examiner* — Karen Masih
(74) *Attorney, Agent, or Firm* — Locke Lord LLP; Scott D. Wofsy; Daniel J. Fiorello

(57) ABSTRACT

A control system for an electric motor powered by a battery can be configured to receive an input instantaneous power or torque command corresponding to a commanded instantaneous power or torque. The control system can be configured to determine if the battery is capable of supplying the commanded instantaneous power or torque based on a state of charge (SOC) of the battery. The control system can be configured such that if the battery is capable of supplying the commanded instantaneous power or torque, the control system outputs the input instantaneous power or torque command, and such that if the battery is not capable of supplying the commanded instantaneous power or torque, the control system outputs an available maximum instantaneous power or torque command corresponding to an available maximum instantaneous power or torque that is less than the commanded instantaneous power or torque.

13 Claims, 2 Drawing Sheets

(51) Int. Cl.
  *B60L 58/12* (2019.01)
  *B60L 50/52* (2019.01)
  *B64D 27/24* (2006.01)

(52) U.S. Cl.
  CPC ..... *B60L 2200/10* (2013.01); *B60L 2240/421* (2013.01); *B60L 2240/423* (2013.01); *B60L 2240/427* (2013.01); *B60L 2240/429* (2013.01); *B60L 2240/547* (2013.01); *B60L 2240/549* (2013.01); *B64D 2221/00* (2013.01)

(58) Field of Classification Search
  CPC ................ B60L 50/52; B60L 2200/10; B60L 2240/421; B60L 2240/423; B60L 2240/427; B60L 2240/429; B60L 2240/547; B60L 2240/549; B64D 27/24; B64D 2221/00
  See application file for complete search history.

(56) References Cited

U.S. PATENT DOCUMENTS

| | | |
|---|---|---|
| 8,565,949 B2 | 10/2013 | Christman et al. |
| 8,897,943 B2 | 11/2014 | Sheidler et al. |
| 2015/0353192 A1* | 12/2015 | Morrison ............... B64D 31/06 244/17.23 |
| 2018/0086222 A1* | 3/2018 | Juang ................ H02J 7/007182 |
| 2019/0069246 A1 | 2/2019 | Pintado et al. |
| 2020/0067335 A1 | 2/2020 | Lim et al. |

\* cited by examiner

ELECTRICAL MOTOR POWER CONTROL SYSTEMS

CROSS-REFERENCE TO RELATED APPLICATIONS

This application claims priority to and the benefit of U.S. Provisional Application No. 63/025,901, filed May 15, 2020, the entire contents of which are herein incorporated by reference in their entirety.

FIELD

This disclosure relates to electric motor power control systems, for example.

BACKGROUND

In hybrid electric or fully electric and electric propulsion activities, a typical source of electrical energy is a battery system. A characteristic of battery systems is as the cells are depleted, i.e., the state of charge decreases, the battery voltage becomes more sensitive to the electrical load. In addition, a motor drive subsystem controlled to output a specific torque acts as a constant power load and will increase the current draw as the voltage decreases. Within the Motor Drive System, the power electronics typically have a minimum voltage at which they are designed to function and protections which disable the system when the voltage drops below these levels. Therefore, at lower battery states of charge, even if energy is available, a very high torque demand from the motor and subsequent high power load on the battery may cause the battery voltage to drop below a level at which the motor controller can function and therefore cause the system to go offline. Furthermore, as the battery becomes depleted, the amount of time that the propulsion system can operate is decreased.

Such conventional methods and systems have generally been considered satisfactory for their intended purpose. However, there is still a need in the art for electric motor power control systems. The present disclosure provides a solution for this need.

SUMMARY

A control system for an electric motor powered by a battery can be configured to receive an input instantaneous power or torque command corresponding to a commanded instantaneous power or torque. The control system can be configured to determine if the battery is capable of supplying and/or permitted to supply the commanded instantaneous power or torque based on a state of charge (SOC) of the battery. The control system can be configured such that if the battery is capable of supplying and/or permitted to supply the commanded instantaneous power or torque, the control system outputs the input instantaneous power or torque command, and such that if the battery is not capable of supplying and/or not permitted to supply the commanded instantaneous power or torque, the control system outputs an available maximum instantaneous power or torque command corresponding to an available maximum instantaneous power or torque that is less than the commanded instantaneous power or torque.

In certain embodiments, the control system can include a comparison module configured to receive the available maximum instantaneous power or torque and to receive the input instantaneous power or torque command, and to determine whether to output the input instantaneous power or torque command or to output the available maximum instantaneous power or torque command. The comparison module can be configured to output the input instantaneous power or torque command if the commanded instantaneous power or torque is less than the available maximum power or torque. The comparison module can be configured to output the available maximum instantaneous power or torque command if the commanded instantaneous power or torque is greater than the available maximum power or torque.

The control system can include a battery model module operatively connected to the comparison module and configured to receive an SOC of the battery and to determine the available maximum instantaneous power or torque based on a state of charge (SOC) of the battery. The battery model module can be configured to output the available maximum instantaneous power or torque to the comparison module.

In certain embodiments, the input instantaneous power or torque command can be an input torque command. The system can further include a power draw module configured to receive the input torque command and a motor speed, and to output an input power command to the comparison module.

In certain embodiments, the control system can include a motor control module operatively connected to the comparison module to receive either the input power command or the available maximum power command, and to receive a motor speed. The motor control module can be configured to control the electric motor to output a torque (e.g., by supplying energy from the battery to the electric motor).

In accordance with at least one aspect of this disclosure, a hybrid electric or fully electric aircraft powerplant can include an electric motor powered by a battery, and a control system configured to provide power to the electric motor. The control system can be any suitable embodiment of a control system disclosed herein (e.g., as described above).

In accordance with at least one aspect of this disclosure, a non-transitory computer readable medium can have computer executable instructions configured to cause a computer to perform a method. The method can include receiving an input instantaneous power or torque command corresponding to a commanded instantaneous power or torque and determining if the battery is capable of supplying and/or permitted to supply the commanded instantaneous power or torque based on a state of charge (SOC) of a battery. The method can include controlling a motor control module or an electric motor to cause the electric motor to output the commanded instantaneous power or torque if the battery is capable of supplying and/or permitted to supply the commanded instantaneous power or torque. The method can include controlling the motor control module or the electric motor to cause the electric motor to output an available maximum instantaneous power or torque that is less than the commanded instantaneous power or torque if the battery is not capable of supplying and/or not permitted to supply the commanded instantaneous power or torque.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
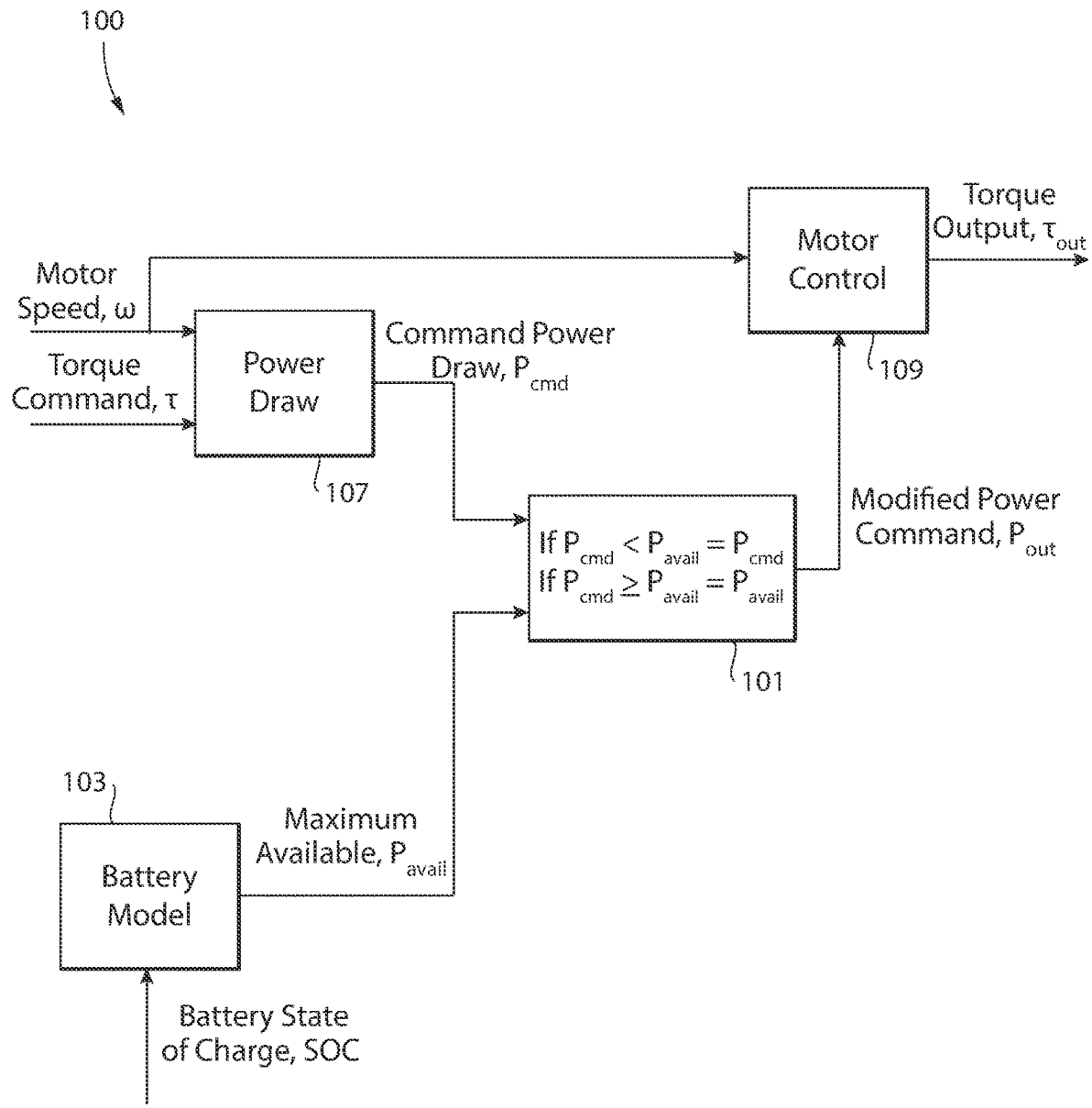
FIG. 1 is a schematic diagram of an embodiment of a control system in accordance with this disclosure.
Figure 2:
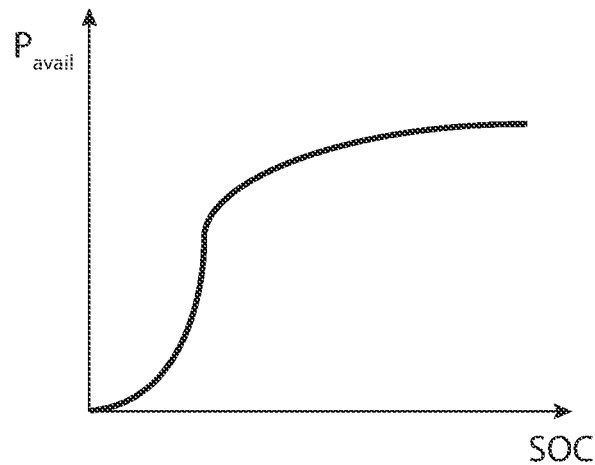
FIG. 2 is a graph showing an embodiment of power available relative to state of charge.
Figure 3:
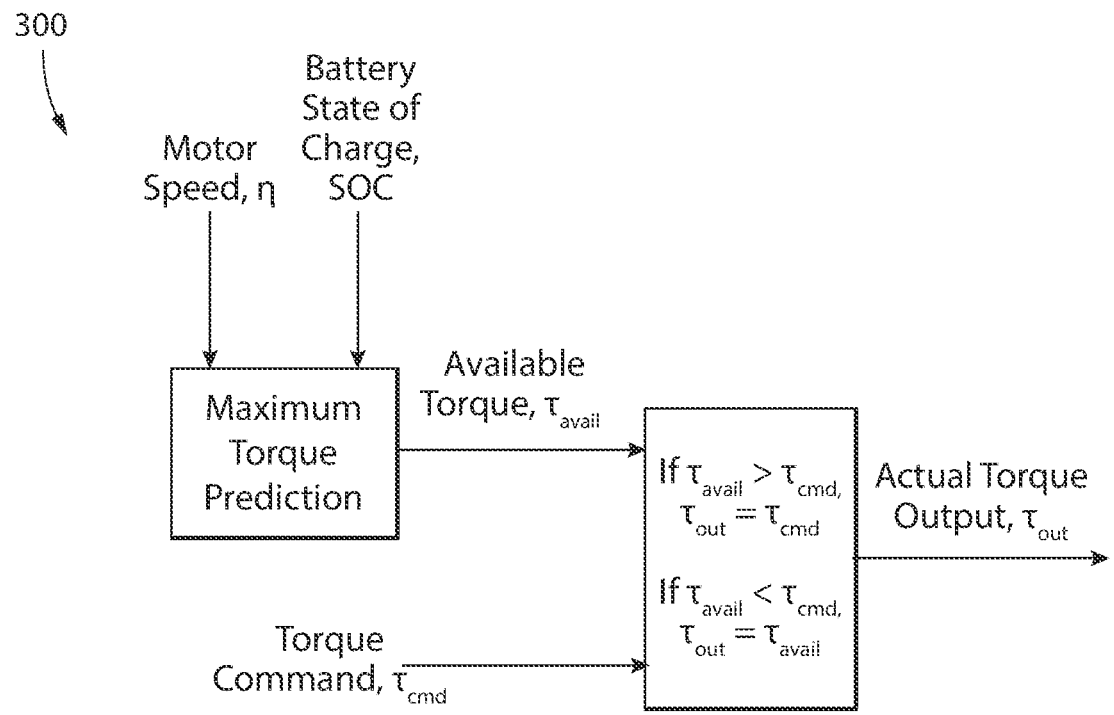
FIG. 3 is another embodiment of a control system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-3. Certain embodiments described herein can be used to prevent shutdown of a battery system, e.g., by preventing voltage from dropping too low when a desired power is commanded.

Referring to FIGS. 1 and 2, a control system 100 for an electric motor (the electric motor being powered by a battery; not shown) can be configured to receive an input instantaneous power or torque command corresponding to a commanded instantaneous power or torque. The control system 100 can be configured to determine if the battery is capable of supplying and/or permitted to supply the commanded instantaneous power or torque based on a state of charge (SOC) of the battery.

The control system 100 can be configured such that if the battery is capable of supplying and/or permitted to supply the commanded instantaneous power or torque, the control system outputs the input instantaneous power or torque command, and such that if the battery is not capable of supplying and/or not permitted to supply the commanded instantaneous power or torque, the control system outputs an available maximum instantaneous power or torque command corresponding to an available maximum instantaneous power or torque that is less than the commanded instantaneous power or torque.

In certain embodiments, the control system 100 can include a comparison module 101 configured to receive the available maximum instantaneous power or torque and to receive the input instantaneous power or torque command, and to determine whether to output the input instantaneous power or torque command or to output the available maximum instantaneous power or torque command. In certain embodiments, the comparison module 101 can be configured to output the input instantaneous power or torque command if the commanded instantaneous power or torque is less than the available maximum power or torque. In certain embodiments, the comparison module 101 can be configured to output the available maximum instantaneous power or torque command if the commanded instantaneous power or torque is greater than the available maximum power or torque. Any other suitable logic for outputting either command is contemplated herein (e.g., equal values can favor either command).

The control system 100 can include a battery model module 103 operatively connected to the comparison module 101 and configured to receive an SOC of the battery and to determine the available maximum instantaneous power or torque based on a state of charge (SOC) of the battery. The battery model module 103 can be configured to output the available maximum instantaneous power or torque to the comparison module 101. The battery model module 103 can include any suitable battery model or other suitable information configured to correlate SOC with a maximum available instantaneous power or torque (e.g., the chart of FIG. 2). Any suitable information pertinent to a maximum available instantaneous power or torque (e.g., battery temperature) without damaging the battery or causing a protective shutdown is contemplated herein.

In certain embodiments, an override command can be used to force the comparison module 101 to output the input instantaneous power or torque command or to bypass the comparison module 101 altogether (e.g., in states of charge above a set or calculated threshold). In certain embodiments, the comparison module 101 can be configured to be bypassed in certain flight phases (e.g., take-off and/or climb) and/or states of charge of the battery. The override command can be any suitable command or any other suitable information, direct or indirect.

In certain embodiments, e.g., as shown, the input instantaneous power or torque command can be an input torque command. The system 100 can further include a power draw module 107 configured to receive the input torque command and a motor speed (e.g., commanded from a speed lever or a speed sensor), and to output an input power command to the comparison module 101.

In certain embodiments, the control system 100 can include a motor control module 109 operatively connected to the comparison module 101 to receive either the input instantaneous power or torque command (e.g., a power command as shown) or the available maximum instantaneous power or torque command, and to receive a motor speed (e.g., from a speed control lever in an aircraft cockpit, or from any other suitable speed selection source). The motor control module 109 can be configured to control the electric motor to output a torque (e.g., by supplying energy from the battery to the electric motor).

In certain embodiments, e.g., as shown in FIG. 3, a similar control scheme can be accomplished with a similar system 300 that operates using only torque values. For example, a maximum torque prediction module can receive the SOC and the motor speed, and determine a maximum available torque, which can be compared to the commanded torque at the comparison module. Any other suitable control scheme to provide a similar function as the embodiment of FIG. 1, for example, is contemplated herein.

Each module disclosed herein (e.g., above), for example, can include any suitable hardware and/or software module(s) configured to perform the function thereof. Any suitable module(s) can be hosted on the same or different hardware, and/or be grouped together or federated in any suitable manner. Any suitable location or locations (e.g., in a motor controller) for any embodiment or portion thereof disclosed herein is contemplated herein.

In accordance with at least one aspect of this disclosure, a hybrid electric or fully electric aircraft powerplant can include an electric motor powered by a battery (not shown), and a control system, e.g., 100, configured to provide power to the electric motor. The control system can be any suitable embodiment of a control system disclosed herein (e.g., as described above).

In accordance with at least one aspect of this disclosure, a non-transitory computer readable medium can have computer executable instructions configured to cause a computer to perform a method. The method can include receiving an input instantaneous power or torque command corresponding to a commanded instantaneous power or torque and determining if the battery is capable of supplying and/or permitted to supply the commanded instantaneous power or torque based on a state of charge (SOC) of a battery. The method can include controlling a motor control module or an electric motor to cause the electric motor to output the commanded instantaneous power or torque if the battery is capable of supplying and/or permitted to supply the commanded instantaneous power or torque. The method can include controlling the motor control module or the electric motor to cause the electric motor to output an available maximum instantaneous power or torque that is less than the commanded instantaneous power or torque if the battery is not capable of supplying and/or not permitted to supply the commanded instantaneous power or torque.

In certain embodiments, a flight phase input and/or SOC threshold can control whether the comparison module is operating. In certain embodiments, an override command can be input directly into the comparison module, for example. FIG. 2 shows an example of power or torque vs SOC. As shown, with a reducing SOC, the available instantaneous torque or power is reduced.

Embodiments can compare maximum available instantaneous torque to a requested torque and can limit output torque to the maximum available torque if the torque command exceeds the maximum available torque. In certain embodiments, when SOC is below a certain point, the control system can operate to determine if the commanded power or torque can be done without tripping a low voltage shutoff, and if the commanded value would cause the battery voltage to drop so low so as to cut off and/or damage the battery, the system can limit to the maximum available torque.

Certain embodiments of a control system and/or portions thereof can be part of a motor controller. However, one or more modules of the system can be integrated in any suitable system and/or otherwise separate (e.g., battery model as part of a battery management system (BMS) instead of within the motor controller). Embodiments can be configured to prevent the motor controller from requesting too much power.

With the torque limit function applied, at lower states of charge of the battery, the system can be prevented from tripping offline with high torque requests. In hybrid electric or fully electric propulsion systems, this ensures that the electric powertrain is available to produce some amount of torque to be converted to thrust even if the full torque is not available due to voltage limitations.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A control system for an electric motor powered by a battery, configured to receive an input instantaneous power or torque command corresponding to a commanded instantaneous power or torque,
    wherein the control system is configured to determine if the battery is capable of supplying and/or permitted to supply the commanded instantaneous power or torque based on a state of charge (SOC) of the battery,
    wherein the control system is configured such that if the battery is capable of supplying and/or permitted to supply the commanded instantaneous power or torque, the control system outputs the input instantaneous power or torque command, and
    wherein the control system is configured such that if the battery is not capable of supplying and/or not permitted to supply the commanded instantaneous power or torque, the control system outputs an available maximum instantaneous power or torque command corresponding to an available maximum instantaneous power or torque that is less than the commanded instantaneous power or torque.

2. The control system of claim 1, wherein the control system includes a comparison module configured to receive the available maximum instantaneous power or torque and to receive the input instantaneous power or torque command, and to determine whether to output the input instantaneous power or torque command or to output the available maximum instantaneous power or torque command.

3. The control system of claim 2, wherein the comparison module is configured to output the input instantaneous power or torque command if the commanded instantaneous power or torque is less than the available maximum power or torque, wherein the comparison module is configured to output the available maximum instantaneous power or torque command if the commanded instantaneous power or torque is greater than the available maximum power or torque.

4. The control system of claim 2, wherein the control system includes a battery model module operatively connected to the comparison module and configured to receive an SOC of the battery and to determine the available maximum instantaneous power or torque based on a state of charge (SOC) of the battery, the battery model module configured to output the available maximum instantaneous power or torque to the comparison module.

5. The control system of claim 2, wherein the input instantaneous power or torque command is an input torque command, wherein the system further includes a power draw module configured to receive an input torque command and a motor speed, and to output an input power command to the comparison module.

6. The control system of claim 5, further comprising a motor control module operatively connected to the comparison module to receive either the input power command or the available maximum power command, and to receive a motor speed, and wherein the motor control module is configured to control the electric motor to output a torque.

7. A hybrid electric or fully electric aircraft powerplant, comprising:
- an electric motor powered by a battery; and
- a control system configured to provide power to the electric motor, the control system configured to receive an input instantaneous power or torque command corresponding to a commanded instantaneous power or torque,
- wherein the control system is configured to determine if the battery is capable of supplying and/or permitted to supply the commanded instantaneous power or torque based on a state of charge (SOC) of the battery,
- wherein the control system is configured such that if the battery is capable of supplying and/or permitted to supply the commanded instantaneous power or torque, the control system outputs the input instantaneous power or torque command, and
- wherein the control system is configured such that if the battery is not capable of supplying and/or not permitted to supply the commanded instantaneous power or torque, the control system outputs an available maximum instantaneous power or torque command corresponding to an available maximum instantaneous power or torque that is less than the commanded instantaneous power or torque.

8. The hybrid electric or fully electric aircraft powerplant of claim 7, wherein control system includes a comparison module configured to receive the available maximum instantaneous power or torque and to receive the input instantaneous power or torque command, and to determine whether to output the input instantaneous power or torque command or to output the available maximum instantaneous power or torque command.

9. The hybrid electric or fully electric aircraft powerplant of claim 8, wherein the comparison module is configured to output the input instantaneous power or torque command if the commanded instantaneous power or torque is less than the available maximum power or torque, wherein the comparison module is configured to output the available maximum instantaneous power or torque command if the commanded instantaneous power or torque is greater than the available maximum power or torque.

10. The hybrid electric or fully electric aircraft powerplant of claim 9, wherein the control system includes a battery model module operatively connected to the comparison module and configured to receive an SOC of the battery and to determine the available maximum instantaneous power or torque based on a state of charge (SOC) of the battery, the battery model module configured to output the available maximum instantaneous power or torque to the comparison module.

11. The hybrid electric or fully electric aircraft powerplant of claim 9, wherein the input instantaneous power or torque command is an input torque command, wherein the system further includes a power draw module configured to receive an input torque command and a motor speed, and to output an input power command to the comparison module.

12. The hybrid electric or fully electric aircraft powerplant of claim 11, further comprising a motor control module operatively connected to the comparison module to receive either the input power command or the available maximum power command, and to receive a motor speed, and wherein the motor control module is configured to control the electric motor to output a torque.

13. A non-transitory computer readable medium having computer executable instructions configured to cause a computer to perform a method, the method comprising:
- receiving an input instantaneous power or torque command corresponding to a commanded instantaneous power or torque;
- determining if a battery is capable of supplying and/or permitted to supply the commanded instantaneous power or torque based on a state of charge (SOC) of the battery,
- wherein if the battery is capable of supplying and/or permitted to supply the commanded instantaneous power or torque, controlling a motor control module or an electric motor to cause the electric motor to output the commanded instantaneous power or torque, and
- wherein if the battery is not capable of supplying and/or not permitted to supply the commanded instantaneous power or torque, controlling the motor control module or the electric motor to cause the electric motor to output an available maximum instantaneous power or torque that is less than the commanded instantaneous power or torque.

* * * * *